W. NACHTIGALL.
DOUBLE SEAT VALVE.
APPLICATION FILED DEC. 3, 1909.

967,820.

Patented Aug. 16, 1910.

Witnesses

Inventor
Wilhelm Nachtigall
By
Attorney.

UNITED STATES PATENT OFFICE.

WILHELM NACHTIGALL, OF LEIPZIG, GERMANY.

DOUBLE-SEAT VALVE.

967,820.  Specification of Letters Patent.  Patented Aug. 16, 1910.

Application filed December 3, 1909. Serial No. 531,214.

*To all whom it may concern:*

Be it known that I, WILHELM NACHTIGALL, a subject of the German Emperor, residing at Leipzig, in Germany, have invented a certain new and useful Improvement in Double-Seat Valves, of which the following is a specification.

In double-seat valves of the type wherein two inter-connected disks or plates control two orifices, and have seats at the circumferences of the said orifices, and wherein one of the plates is elastic or elastically supported to secure tight seating, it may occur from a fault of construction or wear that the rigid plate is first seated and prevents proper seating of the resilient plate.

The object of the present invention is to remove this disadvantage, and the invention consists in providing means whereby both the plates are elastically thrust against their seats, independently of each other.

Two constructions embodying this improvement are shown in the annexed drawings, in which—

Figure 1:
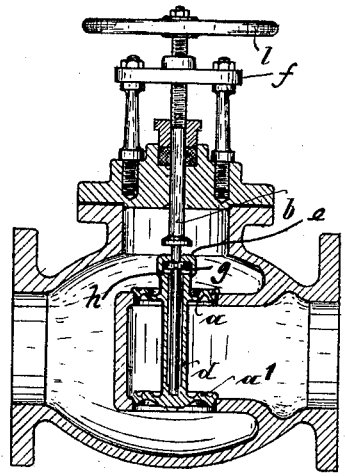
Figure 2:
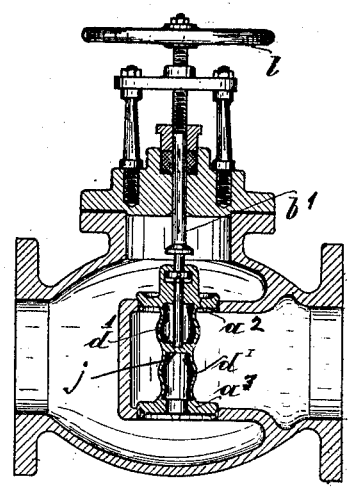

Figure 1 is an elevation, partly in section, of one construction, and Fig. 2 a similar view of the other construction.

Referring in the first place to Fig. 1, $a$ and $a^1$ are the two plates, which are of elastic material and are connected to each other by a tubular piece $d$ having an outward extension $e$ above the plate $a$. The spindle $b$, screw-threaded to work in the threaded eye of a cross-head $f$ above the valve, extends into the tubular part $d$ and has a collar $g$ located in a cavity $h$ in the outward extension of the said part $d$. The spindle $b$ has a hand-wheel $l$ fixed to its outer end. If when the valve is closed the plate $a$ is seated before the plate $a^1$, continued screwing down of the spindle causes the collar to depress the center of the plate $a$, until the plate $a^1$ is also seated. If the plate $a^1$ is seated before the plate $a$, the spindle depresses the center of the plate $a^1$ until the plate $a$ is also seated.

In the modification shown in Fig. 2 the plates $a^2$ and $a^3$ are rigid, but the tubular piece $d^1$ connecting them is elastically extensible. This extensible piece $d^1$ has a central diaphragm $j$ against which the spindle $b^1$ abuts. If the plate $a^2$ is first seated the spindle stretches the upper part of the tubular piece $d^1$ until the plate $a^3$ is also seated. If the plate $a^3$ is first seated the spindle compresses the lower part of the tubular piece $d^1$, until the plate $a^2$ is seated.

What I claim as my invention and desire to secure by Letters Patent of the United States is:—

In a double seat valve system the combination of two valve seatings, two valves movable in the same direction for closing or opening respectively, a spindle for moving said valves collectively toward or from the seatings and an elastic device interposed between each of said valves and the spindle for giving independent elasticity to each of the valves.

In witness whereof I have signed this specification in the presence of two witnesses.

WILHELM NACHTIGALL.

Witnesses:
 RUDOLPH FRICKE,
 WALTER SCHULZE.